May 11, 1926.
G. E. KUYKENDALL
1,584,563
ADJUSTABLE SHOE FOR REVOLVING CLUTCHES
Filed May 10, 1924
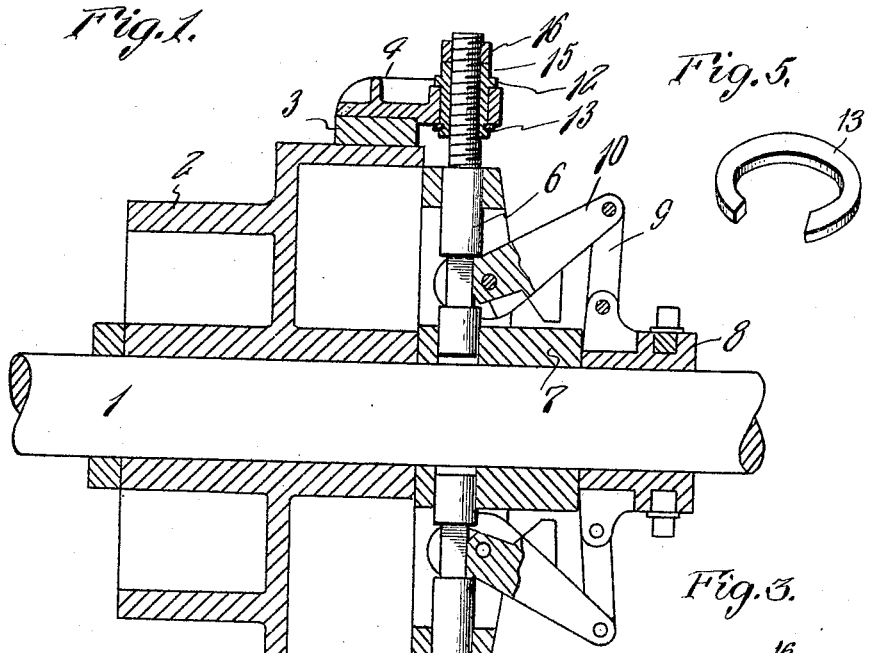
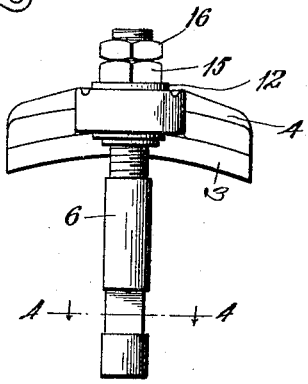
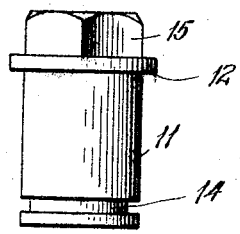
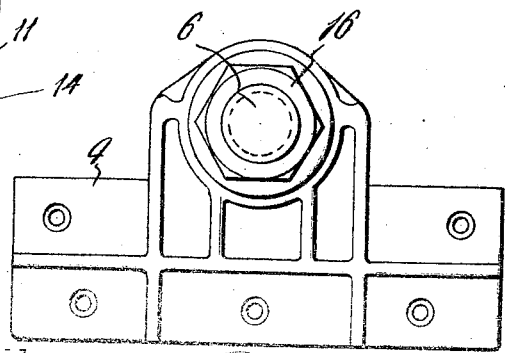
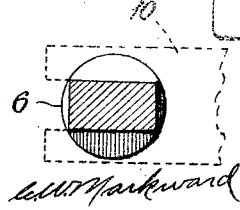
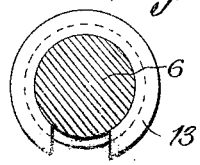
G. E. Kuykendall
INVENTOR
BY Victor J. Evans
ATTORNEY
WITNESS:

Patented May 11, 1926.

1,584,563

UNITED STATES PATENT OFFICE.

GEORGE E. KUYKENDALL, OF DRUMRIGHT, OKLAHOMA.

ADJUSTABLE SHOE FOR REVOLVING CLUTCHES.

Application filed May 10, 1924. Serial No. 712,397.

This invention relates to improvements in clutch means, the general object of the invention being to improve the adjustable connection between the shoe carrying part and the movable member to which it is connected so as to prevent wear on these parts and to permit the movable member to be made stronger than in similar devices as now constructed.

Another object of the invention is to do away with the necessity of turning the adjusting screw by providing a nut member thereon to which the shoe carrying part is rotatably connected so that this nut member is adjusted on the screw in regulating the distance of the shoe from the pulley or other part instead of turning the screw.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a friction clutch showing the invention in use.

Figure 2 is a plan view of the shoe carrying member and its stem.

Figure 3 is a side view of Figure 2.

Figure 4 is a section on line 4—4 of Figure 3.

Figure 5 is a view of the locking ring for holding the shoe carrying part on the nut member.

Figure 6 is a sectional view showing this ring in position.

Figure 7 is a view of the nut member.

In these views, 1 indicates the shaft and 2 the pulley which is rotatably mounted thereon and which is adapted to be frictionally connected with the shaft by means of the clutch shoes 3 which are carried by the supports 4 which have their supporting stems 6 slidably arranged in extending portions of a collar 7 which is keyed to the shaft and which is arranged adjacent a collar 8 slidably but non-rotatably mounted on the shaft and which has pivoted thereto the links 9 which are connected with the levers 10 pivotally connected with the collar 7 and which engage the stems 6 for reciprocating the stems to bring the shoes into and out of engagement with the pulley. The collar 8 is adjusted manually towards and away from the collar 7 to reciprocate the stems as will be understood.

Heretofore in order to adjust the shoe 3 to compensate for wear the stems were threaded to the parts 4 and said stems were turned in order to adjust the parts 4 thereon and thus move the shoes towards or away from the pulley. This would cause the breaking of the stems and in order to prevent this I provide nut members 11 which engage the screw threaded outer ends of the stems 6 and rotatably support the parts 4 by passing through holes formed in said parts and each part 4 is held to its nut member by the flange 12 and the split ring 13 which engages a groove 14 in the nut member. Each nut member is provided with a wrench receiving part 15 so that it can be turned on the screw threaded part of the stem and after these nut members are properly adjusted they are locked in position by the lock nuts 16.

From the foregoing it will be seen that the shoes can be easily and quickly adjusted on the stems by turning the nut members and there is no danger of twisting the stems or breaking them by a turning movement thereof. This will permit the stems to be made of greater diameter, thus increasing their strength.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

Means for adjusting a friction shoe in relation to the part to be gripped, comprising a member to which the shoe is attached, a nut rotatably mounted in said member, a movable stem having a threaded part for receiving the nut, a flange at the outer part of the nut for engaging the shoe supporting member and a groove in the nut adjacent the inner end thereof and a split ring in the groove for holding the shoe supporting member between itself and the flange.

In testimony whereof I affix my signature.

GEORGE E. KUYKENDALL.